United States Patent
Kim et al.

(10) Patent No.: US 10,394,076 B2
(45) Date of Patent: Aug. 27, 2019

(54) LIQUID CRYSTAL DISPLAY

(71) Applicant: LG Display Co., Ltd., Seoul (KR)

(72) Inventors: Jaejun Kim, Goyang-si (KR); HyunWoo Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 20 days.

(21) Appl. No.: 15/692,603

(22) Filed: Aug. 31, 2017

(65) Prior Publication Data

US 2018/0081240 A1    Mar. 22, 2018

(30) Foreign Application Priority Data

Sep. 22, 2016 (KR) .......................... 10-2016-0121310

(51) Int. Cl.
| | | |
|---|---|---|
| *G02F 1/1335* | (2006.01) | |
| *F21V 8/00* | (2006.01) | |
| *G02F 1/1333* | (2006.01) | |

(52) U.S. Cl.
CPC ..... *G02F 1/133603* (2013.01); *G02B 6/0028* (2013.01); *G02B 6/0075* (2013.01); *G02B 6/0083* (2013.01); *G02F 1/133308* (2013.01); *G02F 1/133524* (2013.01); *G02F 1/133615* (2013.01); *G02F 2001/13332* (2013.01); *G02F 2001/133314* (2013.01); *G02F 2001/133322* (2013.01)

(58) Field of Classification Search
CPC .................................................. G02F 1/133308
See application file for complete search history.

(56) References Cited

U.S. PATENT DOCUMENTS

| | | | | |
|---|---|---|---|---|
| 2013/0077014 | A1* | 3/2013 | Yang ................. | G02F 1/133308 349/58 |
| 2014/0375899 | A1* | 12/2014 | Ozeki ............... | G02F 1/133308 348/791 |
| 2015/0301272 | A1* | 10/2015 | Chang ...................... | G02B 6/00 349/58 |

* cited by examiner

*Primary Examiner* — Edmond C Lau
(74) *Attorney, Agent, or Firm* — Polsinelli PC (57) ABSTRACT

According to the present exemplary aspect, provided is a liquid crystal display including a display panel, an LED package including a plurality of LEDs which emits light, a PCB in which the LED package is mounted, a backlight unit which includes a light guide plate which is disposed on a lower surface of the display panel and has a light entering plane opposite to the LED package and a back cover supporting a lower surface of the light guide plate, a housing in which a side surface is in contact with the PCB and an upper surface is in contact with one area of a lower surface of the back cover, and an upper case which applies force to an upper edge portion of the display panel and a lower edge portion of the housing. According to the present exemplary aspects, the light guide plate and the light source may be easily aligned without using separate equipment when the light guide plate and the display panel are brought into direct contact with each other.

20 Claims, 8 Drawing Sheets

LIQUID CRYSTAL DISPLAY

CROSS-REFERENCE TO RELATED APPLICATION

This application claims priority from Korean Patent Application No. 10-2016-0121310, filed on Sep. 22, 2016, which is hereby incorporated by reference in its entirety for all purposes as if fully set forth herein.

BACKGROUND

Field of the Disclosure

The present disclosure relates to a display device, and more particularly, to a liquid crystal display.

Description of the Background

A liquid crystal display is one of flat display devices and displays an image using liquid crystal. The liquid crystal display has been widely used throughout the industry due to thinness, light weight, low power consumption. The liquid crystal display selectively transmits light emitted from a backlight unit by changing an alignment of liquid crystal to display an image. As a light source of a backlight unit of the liquid crystal display, a light emitting diode (LED), a cold cathode fluorescent lamp (CCFL), a hot cathode fluorescent lamp (HCLF) are used. Recently, a light emitting diode having an excellent light efficiency and a high color reproduction rate has been widely used as a light source of the backlight unit.

Recently, the liquid crystal display has been implemented to be slimmer and lighter due to the widespread of mobile devices and the aesthetic of the appearance. To this end, a light guide plate and a display panel are brought into direct contact with each other in implementing a thin liquid crystal display device. However, in this case, a separate component may be used to align and fix a light entering unit of the light guide plate and a light source so that there may be a restriction in implementing a thin liquid crystal display.

SUMMARY

The present disclosure is to provide a liquid crystal display which may easily adjust alignment of the light guide plate and the light source.

Also, the present disclosure is to provide a thin liquid crystal display.

According to an aspect of the present disclosure, there is provided a liquid crystal display, including: a display panel, an LED package including a plurality of LEDs which emits light, a PCB in which the LED package is mounted, a backlight unit which includes a light guide plate which is disposed on a lower surface of the display panel and has a light entering plane opposite to the LED package, a back cover which supports a lower surface of the light guide plate, a housing in which a side surface is in contact with the PCB and an upper surface is in contact with one area of a lower surface of the back cover, and an upper case which applies force to an upper edge portion of the display panel and a lower edge portion of the housing.

In another aspect of the present disclosure, a liquid crystal display may easily align the light guide plate and the light source without using separate equipment when the light guide plate and the display panel are brought into direct contact with each other.

In another aspect of the present disclosure, a liquid crystal display may be implemented to be thinner by reducing the number of components.

In a further aspect of the present disclosure, a liquid crystal display includes a display panel; a printed circuit board (PCB) with an LED package mounted thereon; a light guide plate disposed on a lower surface of the display panel and having a light entering plane aligned to face the LED package; a back cover supporting a lower surface of the light guide plate; a housing having a first side surface in contact with the PCB and an upper surface in contact with a portion of the lower surfaces of the back cover and the light guide plate; and an upper case supporting an upper edge portion of the display panel and a lower edge portion of the housing.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, some aspects of the present disclosure will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Further, in describing components of the present disclosure, terminologies such as first, second, A, B, (a), and (b) may be used. The term is used to distinguish a component from the other component but a nature, an order, or the number of the components is not limited by the terminology. If it is described that a component is "connected" or "coupled" to another component, it is understood that the component is directly connected or coupled to the other component but another component may be "connected" or "coupled" between the components.

Figure 1A:
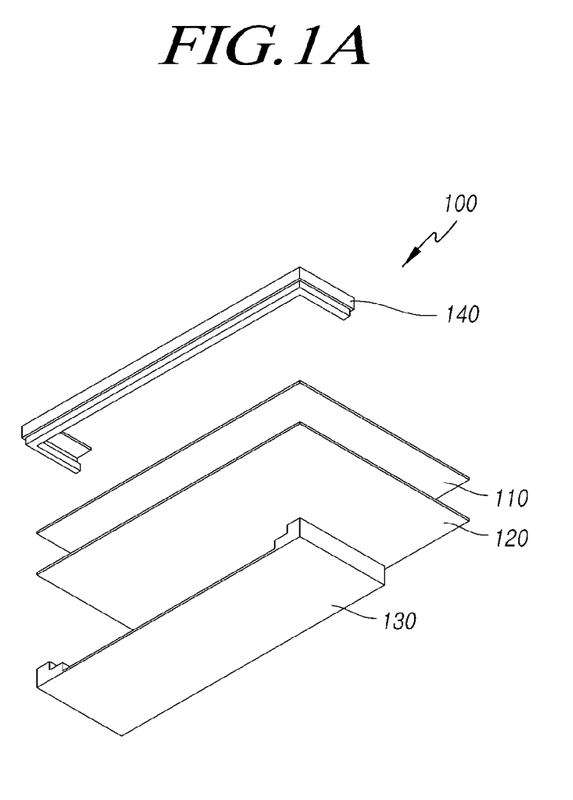
FIG. 1A is an exploded perspective view illustrating an liquid crystal display according to an exemplary aspect of the present disclosure.
Figure 1B:
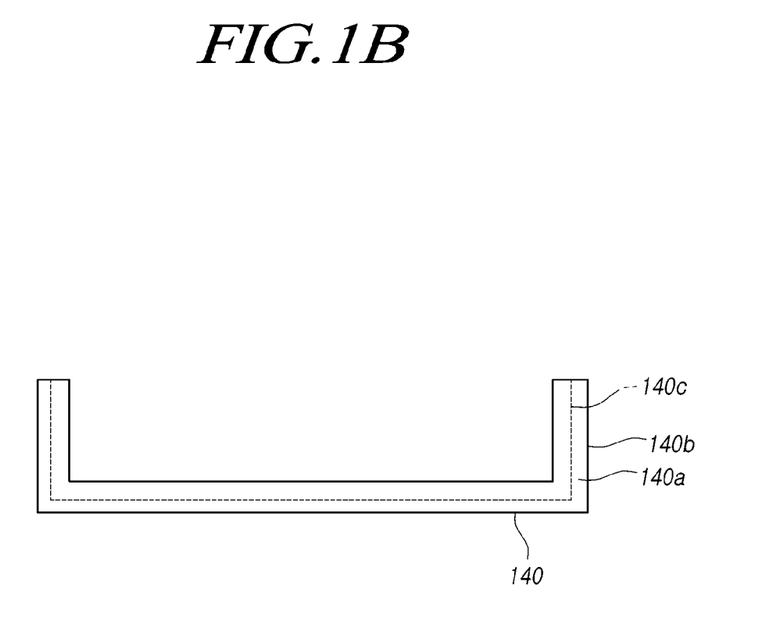
FIG. 1B is a plan view illustrating an upper cover of the liquid crystal display illustrated in FIG. 1A.
Figure 1C:
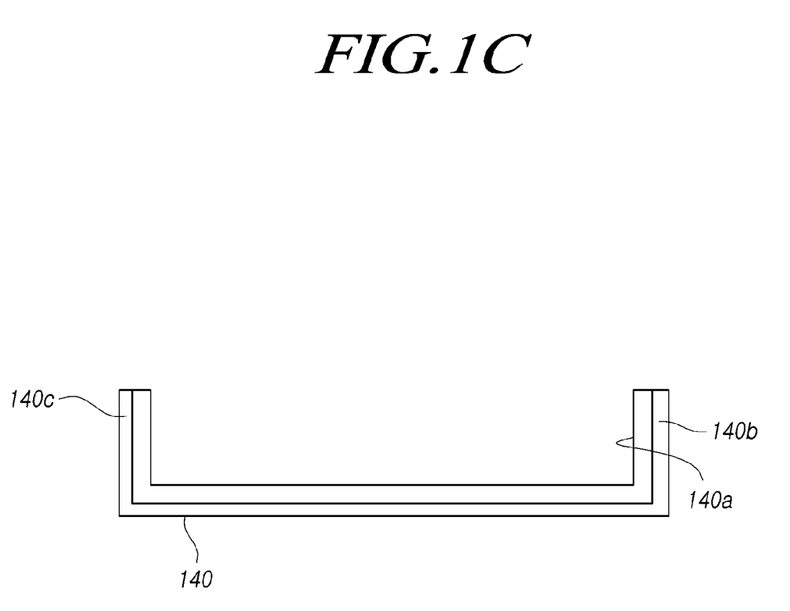
FIG. 1C is a bottom view illustrating an upper cover of the liquid crystal display illustrated in FIG. 1A.

FIG. 1A is an exploded perspective view illustrating a liquid crystal display according to an aspect of the present disclosure, FIG. 1B is a plan view illustrating an upper cover of the liquid crystal display illustrated in FIG. 1A, and FIG. 1C is a bottom view illustrating an upper cover of the liquid crystal display illustrated in FIG. 1A, Referring to FIGS. 1A to 1C, a liquid crystal display 100 includes a display panel 110, a backlight unit 120, a housing 130, and an upper cover 140.

The display panel 110 includes a first substrate (not illustrated) and a second substrate (not illustrated) which face each other and are bonded with a liquid crystal layer (not illustrated) therebetween. On the first substrate, a plurality of gate lines and data lines intersect and a thin film transistor is provided at each intersection to form a plurality of pixels. Further, the thin film transistor is controlled to adjust alignment of molecules of liquid crystal for every pixel. On the second substrate, red, green, and blue color filters corresponding to the pixels, a black matrix disposed between the pixels, and a common electrode are formed. Further, the display panel 110 may include a first polarizer and a second polarizer which are attached on outer surfaces of the first substrate and the second substrate, respectively.

The backlight unit 120 may be disposed below the display panel 110. The backlight unit 120 may include a light source and a light guide plate which supplies light emitted from the light source to the display panel 110 as a surface light source. The light source may be a light emitting diode (LED). Here, the backlight unit 120 is illustrated to have a rectangular shape having a predetermined thickness. However, it is illustrated for the convenience of description and a detailed structure will be illustrated in FIGS. 2 to 5.

The housing 130 accommodates the backlight unit 120 and the display panel 110 and adjusts alignment of the light source and the light guide plate of the backlight unit 120. The alignment of the light source and the light guide plate means that the center line of the light emitted from the light source matches the center line of a light entering plane of the light guide plate. However, the present disclosure is not limited thereto, and the light source and the light guide plate may be located in a position where the emitted light from the light source is transmitted to the light guide plate with a high light efficiency. The light efficiency may correspond to an amount of light transmitted from the light source which is transmitted to the light guide plate. When the light source and the light guide plate are not aligned, the light efficiency of the light which is transmitted to the display panel 110 is disadvantageously lowered. Therefore, it is important to adjust and maintain the alignment. Further, when the backlight unit 120 and the display panel 110 are accommodated in the housing 130, the alignment of the light source and the light guide plate is adjusted by a shape of the housing 130 so that the alignment may be easily adjusted. Further, the housing 130 may not cover the entire rear surface of the backlight unit 120, but cover a part of the backlight unit 120. Specifically, when the display device 100 is used upright, the housing 130 may be disposed below a rear surface of the backlight unit 120.

The upper cover 140 is accommodated in the housing 130 to fix the backlight unit 120 and the display panel 110 in a state in which the alignment of the light source and the light guide plate is adjusted so that misalignments of the light guide plate and the light source can be prevented. Further, when the upper cover 140 is seen from a front surface, an upper surface 140a is formed as illustrated in FIG. 1B and covers an edge area of one side of a front edge area of the quadrangular display panel 110 and a part of edge areas of two sides connected to the one side. Here, the edge area of the display panel 110 may refer to a border having a predetermined width on the front surface of the display panel 110. Further, as illustrated in FIG. 1C, when the upper cover 140 is seen from a rear surface, the upper cover 140 has a lower surface 140c and the edge area of the housing 130 is supported by the lower surface 140c. The combination of the display panel 110 and the backlight unit 120 is fixed by the upper cover 140 so that it is possible to prevent the light guide plate and the light source which are aligned by the housing 130 from being misaligned due to an external impact and a temperature change.

Further, a side surface 140b of the upper cover 140 is bent to form a step. The upper cover 140 has an elastic force due to the step so that the backlight unit 120 and the display panel 110 accommodated in the housing 130 is easily inserted into the upper cover 140. Further, even though the light guide plate expands due to the external impact or the temperature change, the light guide plate and the light source are fixed to the housing 130 by the upper cover 140 so that the misalignments can be prevented.

Figure 2:
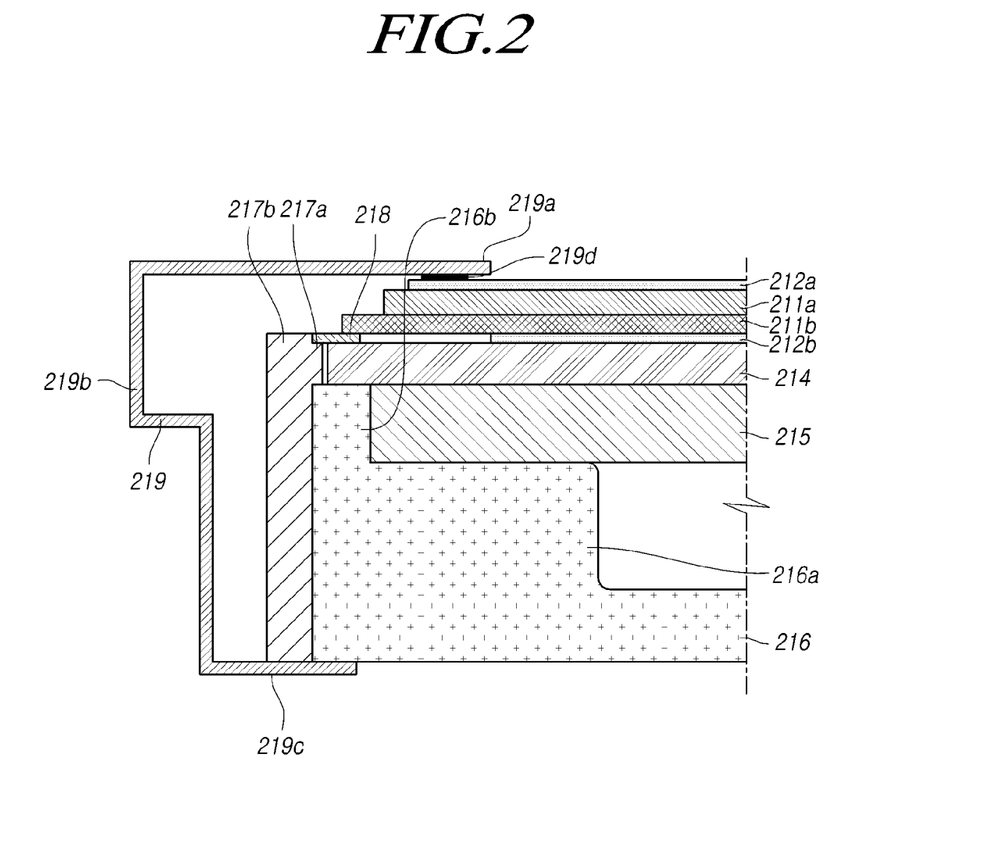
FIG. 2 is a cross-sectional view illustrating a side of the liquid crystal display according to an aspect of the present disclosure.
Figure 3:
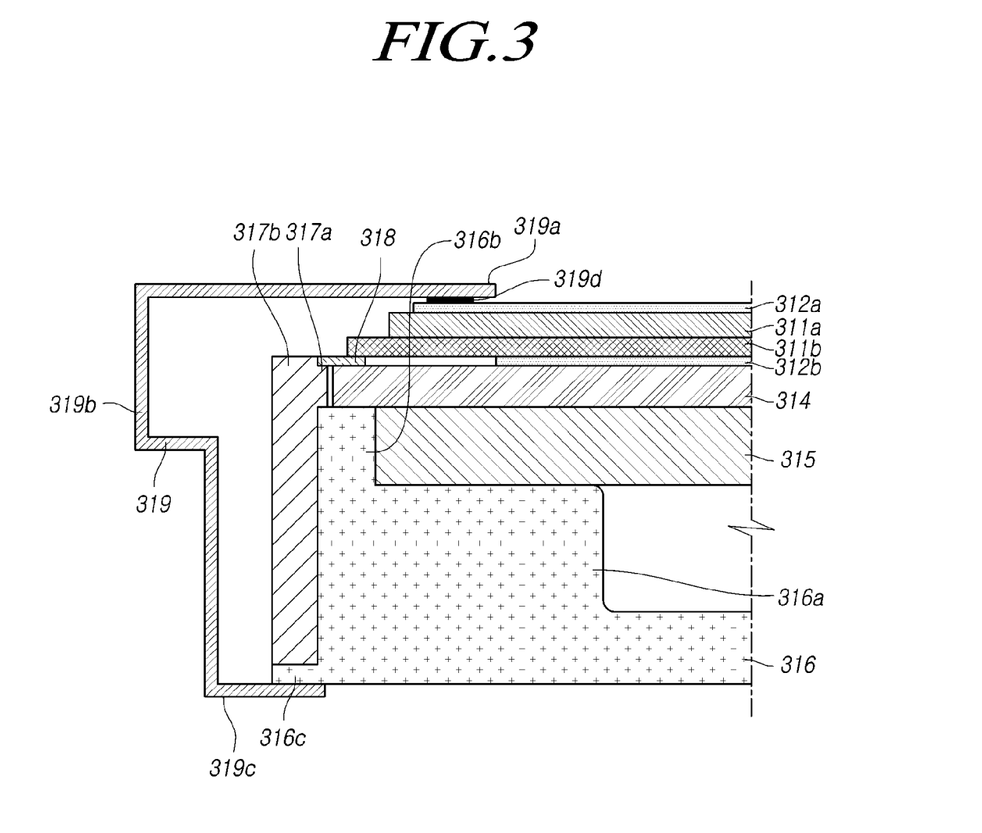
FIG. 3 is a cross-sectional view illustrating a side of the liquid crystal display according to another aspect of the present disclosure.
Figure 4:
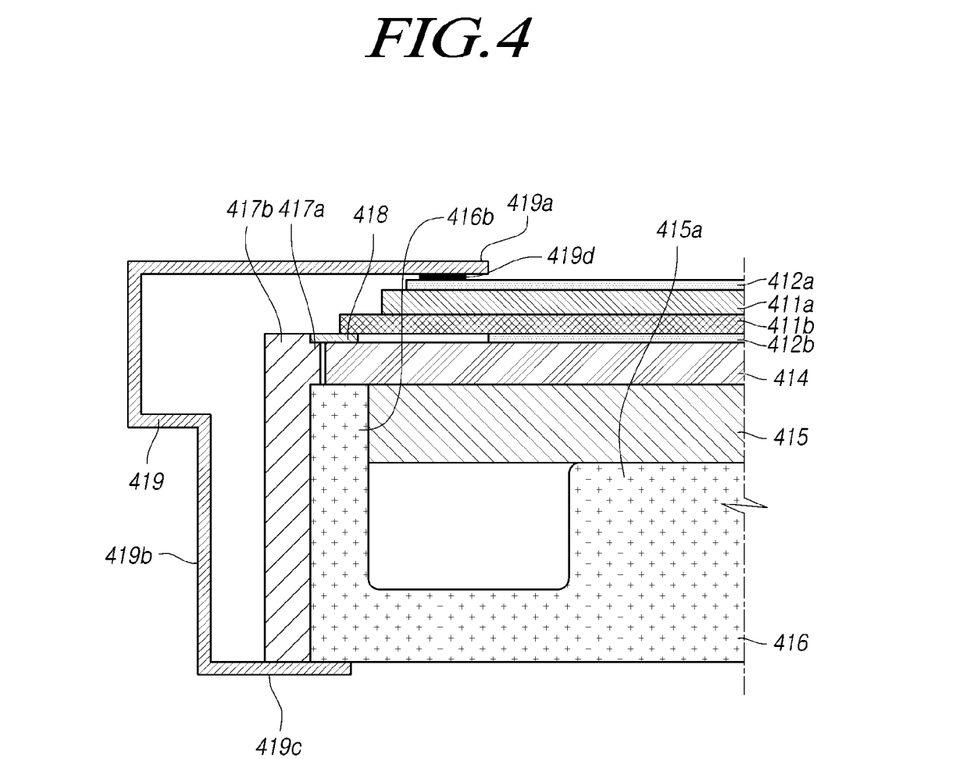
FIG. 4 is a cross-sectional view illustrating a side of the liquid crystal display according to still another aspect of the present disclosure.
Figure 5:
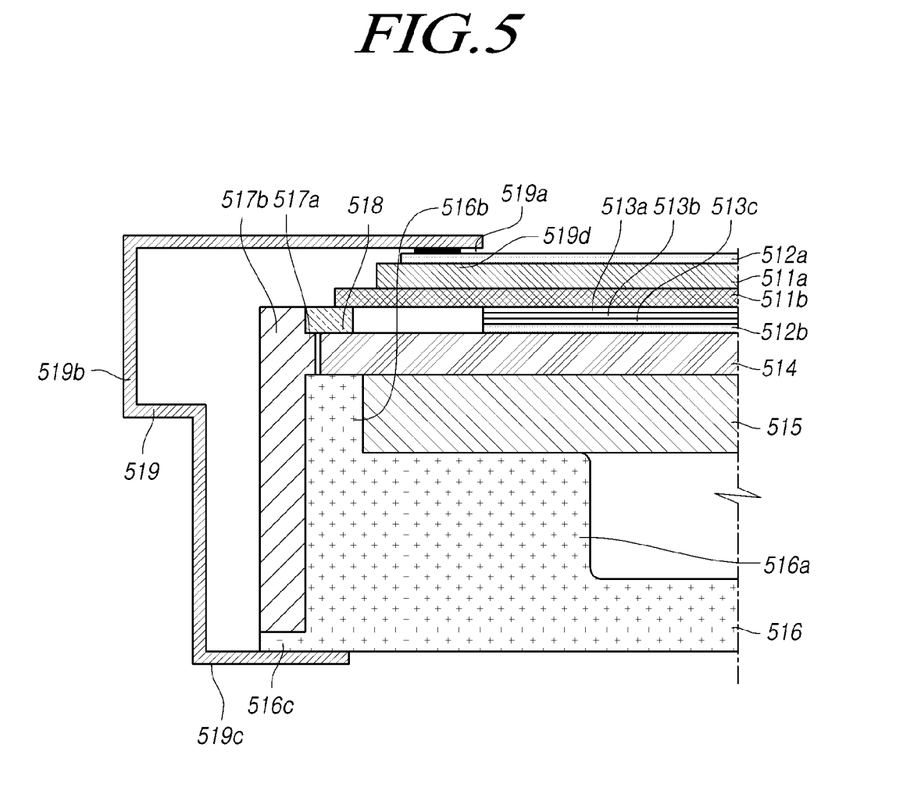
FIG. 5 is a cross-sectional view illustrating a side of the liquid crystal display according to yet another aspect of the present disclosure.

FIG. 2 is a cross-sectional view illustrating a side of the crystal display illustrated in FIG. 1 according to an aspect of the present disclosure, FIG. 3 is a cross-sectional view illustrating a side of the crystal display illustrated in FIG. 1 according to another aspect of the present disclosure, FIG. 4 is a cross-sectional view illustrating a side of the crystal display illustrated in FIG. 1 according to still another aspect of the present disclosure, and FIG. 5 is a cross-sectional view illustrating a side of the crystal display illustrated in FIG. 1 according to yet another aspect of the present disclosure.

Referring to FIGS. 2 to 5, in a display device 100, a back cover 215 which supports a lower surface of a light guide plate 214 is disposed on a housing 216, and the light guide plate 214 is disposed above the back cover 215. Further, a PCB 217b in which an LED package 217a including a plurality of LEDs is mounted on a side surface of the housing 216 so that the LED is disposed to face a light entering plane of the light guide plate 214. Further, a display panel 110 may be disposed on an upper surface of the light guide plate 214. Here, the PCB 217b in which the LED package 217a is mounted, the light guide plate 214 and the back cover 215 may correspond to the backlight unit 120 of FIG. 1.

The housing 216 is formed to have a step so that a step jaw portion 216a is formed and a portion of the back cover 215 may be in contact with the step jaw portion 216a. When a portion of the back cover 215 is brought into contact with the housing 216 by the step jaw portion 216a, a contact area of the back cover 215 and the housing 216 can be reduced so that heat generated from the PCB 217b in which the LED package 217a disposed on a side surface of the back cover 215 is mounted may not be transmitted from the housing 216 to the back cover 215. As illustrated in FIG. 2, the step jaw portion 216a may be formed to be close to the PCB 217b. The housing 216 is not in contact with the entire lower surface of the back cover 215 by the formed step jaw portion 216a, but only the step jaw portion 216a is in contact with the border of the back cover 215.

Further, a first protruding portion 216b is formed at an end of the step jaw portion 216a of the housing 216 and the first protruding portion 216b is interposed between the back cover 215 and the PCB 217b so that the upper surface of the first protruding portion 216b may support a border of the light guide plate 214. Further, the PCB 217b is bonded to the side surface of the housing 216 to be attached so that the PCB 217b is fixed to the side surface of the housing 216. Therefore, the LED in the LED package 217a and the light entering plane of the light guide plate 214 can be aligned.

Further, as illustrated in FIG. 3, a second protruding portion 316c may be formed below the side surface of the housing 316. The second protruding portion 316c may support a lower portion of the PCB 317b. The lower portion of the PCB 317b is supported by the second protruding portion 316c so that the LED package 317a mounted in the PCB 317b and the light entering plane of the light guide plate 314 can be more easily aligned.

A surface where the PCB 217b and the housing 216 are in contact with each other may be fixed by bonding. Here, although the bonding means fixing using an adhesive, the present disclosure is not limited thereto and the surface may be fixed using screws, etc.

Further, as illustrated in FIG. 4, the step jaw portion 415a may be formed on a surface of the housing 416 which is distant from a side surface which is in contact with the PCB 417b.

Further, the display panel 110 may be disposed on the upper surface of the light guide plate 214. The display panel 110 includes a first substrate 211a and a second substrate 211b which face each other with a liquid crystal layer (not illustrated) therebetween. Further, the display panel 110 may include a first polarizer 212a and a second polarizer 212b which are attached onto an upper surface of the first substrate 211a and a lower surface of the second substrate 211b, respectively. At least a part of the lower surface of the display panel 110 may be in direct contact with at least a part of the upper surface of the light guide plate 214. At least a part of the lower surface of the display panel 110 may be a surface of the lower surface of the display panel onto which the second polarizer 212b is attached. When the light guide plate 214 is in direct contact with the display panel 110, the thickness of the display device 100 can be implemented to be smaller.

The upper case 219 applies force to an edge area of the upper surface of the display panel 110 and an edge area of the lower surface of the housing 216 to fix the display panel 110 and the light guide plate 214. Further, the upper case 219 is fastened to an edge area which is close to the light entering plane of the light guide plate 214 and the light source among the upper edge area of the display panel 110 and the lower edge area of the housing 216 so that the alignment of the light entering plane of the light guide plate 214 and the light source can be maintained by the upper case 219. Even though the light guide plate 214 thermally expands or external force is applied thereto, since the upper case 219 presses the display panel 110, misalignment of the light guide plate 214 and the LED package 217a can be prevented. Further, the upper case 219 includes an upper surface 219a which covers the edge area of the upper surface of the display panel 110, a lower surface 219c which covers the edge area of the lower surface of the housing 216, and a side surface 219b which connects the upper surface 219a and the lower surface 219c and is bent. When the side surface 219b of the upper case 219 is bent, an elastic force is generated in the upper case 219 by the bending and the fastening force of the upper case 219 can be stronger by the elastic force.

Further, the lower surface 219c of the upper case 219 covers a part of the lower surface of the housing 216 so that the housing 216 and the display panel 110 may be easily seated in the upper case 219. Further, the display device may further include a third protruding portion 219d which is in contact with the edge area of the front surface of the display panel 110 to apply force, on a surface of the upper surface of the upper case 219 which is in contact with the front surface of the display panel 110. Force of the upper surface 219a of the upper case 219 which presses the first substrate 211a of the display panel is concentrated by the third protruding portion 219d and the force of the upper surface 219a of the upper case 219 which presses the display panel 110 is vertically applied by the third protruding portion 219d so that the upper case 219 efficiently presses the display panel 110. By doing this, it is possible to prevent the light guide plate 214 from upwardly rising due to an outer wall or expansion caused by rise of an ambient temperature and thereby to prevent misalignments.

Further, in the housing 216, the upper surface of the step jaw portion 216a which is in contact with area portion of the lower surface of the back cover 215 overlaps the upper edge portion of the display panel 110 to which the force is applied by the upper case 219 so that the pressing force of the upper case 219 is transmitted to the step jaw portion 216a of the housing 216, so that efficiency of a coupling force by the upper case 219 is increased.

Further, in order to prevent a hot spot due to light loss which is generated by an interval between the LED package 217a and the light entering plane of the light guide plate 214, a light shielding layer 218 may be disposed on an upper surface of the light guide plate 214 which is close to the light entering plane of the light guide plate 214 between the LED package 217a and the light guide plate 214. The light shield layer 218 uses an insulating tape, so that the hot spot may be simply suppressed. Therefore, the hot spot can be prevented without using an additional structure so that the display device 100 may be implemented to be thinner.

Further, as illustrated in FIG. 5, the liquid crystal display may further include at least one optical sheet (not illustrated) disposed between the light guide plate 514 and the display panels 511a, 511b, 512a, and 512b. At least one of a diffusion sheet 513a, a prism sheet 513b, and a protective sheet 513c may be an optical sheet. Therefore, as illustrated in FIGS. 2 to 4, in the liquid crystal display, the light guide plate 514 and the display panels 511a, 511b, 512a, and 512b are in direct contact with each other to be implemented to be thinner. Further, as illustrated in FIG. 5, the optical sheet is included between the light guide plate 514 and the display panels 511a, 511b, 512a, and 512b to improve an optical quality of the backlight unit.

Figure 6:
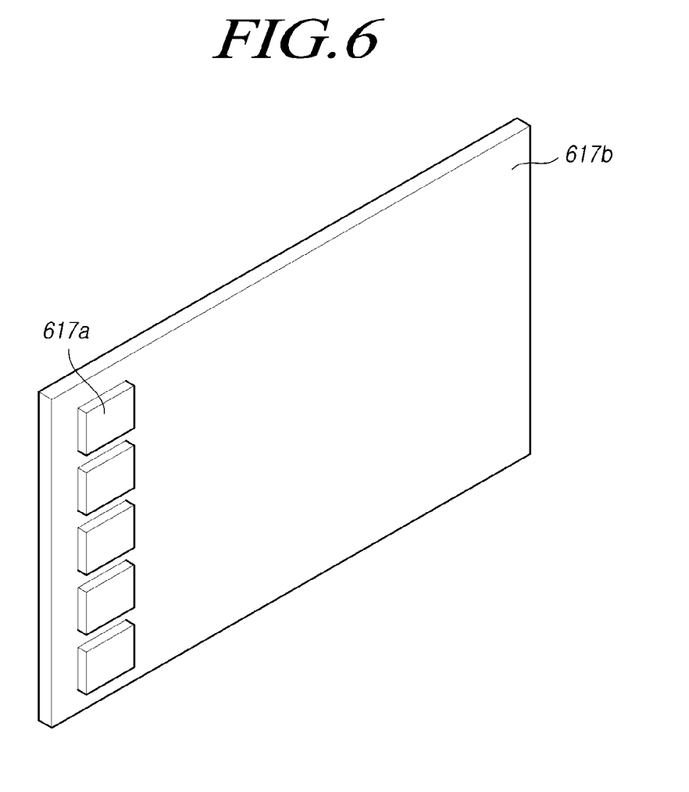
FIG. 6 is a perspective view illustrating a PCB employed in FIGS. 2 to 5.

FIG. 6 is a perspective view illustrating a PCB employed in FIGS. 2 to 5 according to the present disclosure.

Referring to FIG. 6, a wiring line (not illustrated) is installed in the PCB 617b so that the power is supplied through the wiring line. Further, the plurality of LEDs 617a is disposed in one line at one end of the PCB 617b and is connected to the wiring line, so that each LED 617a is supplied with power to emit light. Here, the plurality of LEDs which is disposed in one line may be an LED package illustrated in FIGS. 2 to 5. When the size of the PCB 617b and a position of the LEDs 617a to be disposed on the PCB 617b are specified, the PCB 617b can be precisely attached on the side of the housing, so that the LED 617a and the light entering plane of the light guide plate can be easily aligned.

It will be appreciated that technical spirit of the present disclosure has been described herein for purposes of illustration by the above description and the accompanying drawings, and that combination, separation, substitution, and modifications of components may be made by those skilled in the art without departing from the scope and spirit of the present disclosure. Therefore, the exemplary aspects of the present disclosure are provided for illustrative purposes only but not intended to limit the technical spirit of the present disclosure. The scope of the technical spirit of the present disclosure is not limited thereto. The protective scope of the present disclosure should be construed based on the following claims, and all the technical concepts in the equivalent scope thereof should be construed as falling within the scope of the present disclosure.

What is claimed is:

1. A liquid crystal display, comprising:
   a display panel;
   a backlight unit which includes an LED package, a printed circuit board (PCB) on which the LED package is mounted, and a light guide plate which is disposed on a lower surface of the display panel and has a light entering plane facing the LED package;
   a back cover which supports a lower surface of the light guide plate;
   a housing having a side surface in contact with the PCB and an upper surface in contact with a portion of the lower surface of the back cover; and
   an upper case supporting a portion of the display panel and a portion of the housing,
   wherein the portion of the display panel is supported by a portion of the upper case extended above the display panel and the portion of the housing is supported by a portion of the upper case extended under the housing.

2. The liquid crystal display according to claim 1, wherein the housing includes a first protruding portion at one end of the upper surface and in contact with the PCB, the back cover and the light guide plate.

3. The liquid crystal display according to claim 2, wherein the housing includes a second protruding portion protruding toward a lower portion of the side surface and the upper surface of the second protruding portion supports a lower surface of the PCB.

4. The liquid crystal display according to claim 1, further comprising a light shielding layer on an upper surface of the light guide plate at proximity of the light entering plane is located.

5. The liquid crystal display according to claim 3, wherein the upper case includes an upper part which covers an upper edge area of the display panel, a lower part which covers edge areas of the lower surface of the housing, and a side portion which connects the upper part and the lower part.

6. The liquid crystal display according to claim 5, further comprising:
   a third protruding portion in contact with the upper part of the upper case and an upper surface of the display panel and applying pressure therebetween.

7. The liquid crystal display according to claim 6, wherein the housing has a portion in contact with a portion of the lower surface of the back cover vertically overlapping an area where the upper case supports the upper edge portion of the display panel.

8. The liquid crystal display according to claim 1, further comprising:
   at least one optical sheet disposed between the light guide plate and the display panel.

9. The liquid crystal display according to claim 1, wherein the housing has step jaw portion in contact with the lower surface of the back cover.

10. A liquid crystal display, comprising:
    a display panel;
    a printed circuit board (PCB) with an LED package mounted thereon;
    a light guide plate disposed on a lower surface of the display panel and having a light entering plane aligned to face the LED package;
    a back cover supporting a lower surface of the light guide plate;
    a housing a first side surface in contact with the PCB and an upper surface in contact with a portion of the lower surfaces of the back cover and the light guide plate; and
    an upper case supporting an upper edge portion of the display panel and a lower edge portion of the housing.

11. The liquid crystal display according to claim 10, wherein the housing has a portion in contact with a lower surface of the PCB.

12. The liquid crystal display according to claim 10, wherein the housing has a second side surface in contact with a side surface of the back cover.

13. The liquid crystal display according to claim 10, further comprising a protruding portion in contact with the upper part of the upper case and an upper surface of the display panel and applying pressure therebetween.

14. The liquid crystal display according to claim 10, wherein the upper case comprises an upper part covering an upper edge area of the display panel, a lower part covering an edge of the lower surface of the housing, and a side portion connecting the upper part and the lower part.

15. the liquid crystal display according to claim 10, further comprising at least one optical sheet disposed between the light guide plate and the display panel.

16. The liquid crystal display according to claim 15, wherein the at least one optical sheet comprises at least one of a diffusion sheet, a prism sheet and a protective sheet.

17. The liquid crystal display according to claim 10, wherein the light guide plate is directly in contact with the display panel.

18. The liquid crystal display according to claim 10, further comprising a light shielding layer on an upper surface of the light guide plate at proximity of the light entering plane is located.

19. The liquid crystal display according to claim 18, wherein the light shielding layer includes an insulating tape and prevents a hot spot.

20. The liquid crystal display according to claim 10, wherein the upper cover has a bent side surface to form a step to provide an elastic force.

* * * * *